United States Patent [19]

Honguh et al.

[11] Patent Number: 5,268,887
[45] Date of Patent: Dec. 7, 1993

[54] OPTICAL RECORDING MEDIUM HAVING OFFSET-COMPENSATING AREAS

[75] Inventors: Yoshinori Honguh; Teruo Murakami, both of Yokohama, Japan

[73] Assignee: Kabushiki Kaisha Toshiba, Kawasaki, Japan

[21] Appl. No.: 943,125

[22] Filed: Sep. 10, 1992

Related U.S. Application Data

[63] Continuation of Ser. No. 697,622, May 9, 1991, abandoned.

[30] Foreign Application Priority Data

May 15, 1990 [JP] Japan .................................. 2-122889
Nov. 27, 1990 [JP] Japan .................................. 2-320982

[51] Int. Cl.$^5$ .............................................. G11B 7/24
[52] U.S. Cl. ............................ 369/44.13; 369/44.26;
    369/275.30; 369/275.40
[58] Field of Search ............... 369/44.13, 44.26, 44.34,
    369/44.11, 275.1, 275.3, 275.4, 109, 44.28, 44.32

[56] References Cited

U.S. PATENT DOCUMENTS

| | | | |
|---|---|---|---|
| 4,870,508 | 9/1989 | Van Rosmalen et al. | 358/342 |
| 4,949,331 | 9/1990 | Maeda et al. | 369/275.3 |
| 5,023,856 | 6/1991 | Raaymakers et al. | 369/44.13 |

FOREIGN PATENT DOCUMENTS

| | | |
|---|---|---|
| 0272873 | 6/1988 | European Pat. Off. . |
| 0364224 | 4/1990 | European Pat. Off. . |
| 0369989 | 5/1990 | European Pat. Off. . |
| 3618720 | 12/1986 | Fed. Rep. of Germany . |
| 2-68721(A) | 3/1990 | Japan .................. 369/275.4 |

OTHER PUBLICATIONS

"Handbook on Optical Disc Technique, supervised by: Incorporated Fundation Hikari-Sangyo Gijutsu Shinko-Kyokai" published, as First Impression of First Edition, by Nikkei MacGlow Hill Co., Ltd. Sep. 10, 1987.
"Investigation Research III on Standardization of Optical Disc, Incorporated Fundation Hikari-Sangyo Gijutsu Shinko-Kyokai" published on Mar. 10, 1988.

*Primary Examiner*—Aristotelis Psitos
*Assistant Examiner*—Muhammad N. Edun
*Attorney, Agent, or Firm*—Oblon, Spivak, McClelland, Maier & Neustadt

[57] ABSTRACT

A optical recording medium having guide grooves which are parallel or substantially parallel, tracks formed among the guide grooves, offset-compensating areas spaced apart in lengthwise direction of the guide grooves and separating each of the tracks into portions, first pits formed in each portion of each of the tracks and arranged in a center line of the track, and second pits formed in the offset-compensating areas and extending in the center line of the tracks. Also disclosed herein is an optical recording apparatus for applying a light beam to the optical recording medium as defined above, thereby to record data on the medium and reproduce data there from. In the apparatus, two tracking error signals, which represent the distance between the center of a light spot formed on the medium and the center line of a target track, are generated from diffracted light beams from any one of the guide grooves and the offset-compensating area adjacent to the guide groove. The first tracking error signal is corrected in accordance with the second tracking signal, and the position of the light spot is controlled in accordance with the first tracking error signal thus corrected.

5 Claims, 7 Drawing Sheets

OPTICAL RECORDING MEDIUM HAVING OFFSET-COMPENSATING AREAS

This application is a continuation of application Ser. No. 07/697,622, filed on May 5, 1991, now abandoned.

BACKGROUND OF THE INVENTION

1. Field of the Invention

The present invention mainly relates to an optical recording medium such as an optical disk, and also to an optical recording apparatus which uses the optical recording medium.

2. Description of the Related Art

Various types of optical disk apparatuses are known, each can record data by applying an intense light beam such as a laser beam onto the concentric circular tracks or a spiral track formed on an optical disk, and also can read or reproduce the data from the optical disk by applying a less intense light beam onto the concentric tracks or the spiral track. The optical disk apparatuses are classified into three types. The first type is write once (read many) type, the second type is rewritable-type, and the third type is read only type.

In recent years, the write once type optical disk apparatus has been developed and put on the market before the rewritable-type apparatus. With this optical disk apparatus the user can write data on the disk, in addition to the data recorded on the disk by the manufacturer of the disk. The write once type apparatus was first made commercially available in the form of a document filing system. Now it is also available in the form of a peripheral memory device of computer for highly reliability, and the like. The rewritable-type apparatus can erase data from an optical disk and can write new data thereon.

The technique employed in the optical disk apparatus of either type, for recording and reproducing data, is performed also in an optical card apparatus for recording data on an optical card and reproducing it therefrom, and in an optical tape apparatus for recording data on optical tape and reproducing it therefrom. Hereinafter, optical disks, optical cards, and optical tape will be generally called "optical data-recording medium," and any apparatus for recording data on, and reproducing it from, an optical disk, an optical card, or optical tape will be generally called "optical data-recording/reproducing apparatus."

The concentric circular tracks or the turns of the spiral track of most commercially available optical disks are spaced apart at intervals of about 1.6 μm. To record data on the track, a converged laser beam is applied from a laser onto the track, forming a light spot having a diameter of about 1.2 μm on the track, and forming a record mark having a diameter of about 1 μm in the track. The record mark is formed by destroying or deforming that portion of the recording layer of the disk which has been illuminated with the laser beam. Alternatively, the mark is formed by changing the optical property of said portion of the recording layer.

The optical disk has a groove extending along the spiral track or grooves extending along the concentric tracks, respectively. An optical disk apparatus has a tracking control system comprising a multi-segment photo-detector and a device for controlling the position of the laser spot. The optical detector receives the laser beam reflected from any groove and generates a tracking error signal from this beam. The error signal is input to the position control device. In accordance with the error signal, the device moves the objective lens to such a position that the laser-beam spot lands fully on the target track.

The tracking control system has a drawback. When the disk is placed eccentric to the spindle of the disk drive, the target track deviates from the axis of the objective lens which converges the laser beam. When the disk warps or inclines, the beam reflected from the target track deviates from the optical axis of the optical detector. In either case, the tracking error signal has the offset which corresponds to the deviation of the track or the reflected beam. The offset contained in the error signal results in an inaccurate tracking control. Hence, the laser beam applied via the objective lens forms a light spot on the disk, which is deviated a little from the target track. Consequently, data cannot be correctly recorded on, or reproduced from, the target track, and the optical disk apparatus is less reliable than required.

To eliminate the drawback of the tracking control system, a new tracking control technique has been developed. This technique is characterized in two respects. First, an optical disk is used which has elongated mirror-surface areas extending in the radial direction of the disk and mutually spaced apart, and discontinuous guide grooves extending along the spiral track or concentric tracks and located among the mirror-surface areas. Second, the laser beam reflected from any mirror-surface area is converted into an electric signal, and this signal corrects the tracking error signal generated from the laser beam reflected from the guide groove adjacent to the mirror-surface area. The optical disk, for example, a write once type disk having a diameter of 130 mm, is pre-formatted such that it has a number of sectors, and each sector has one mirror-surface area.

Figure 7:
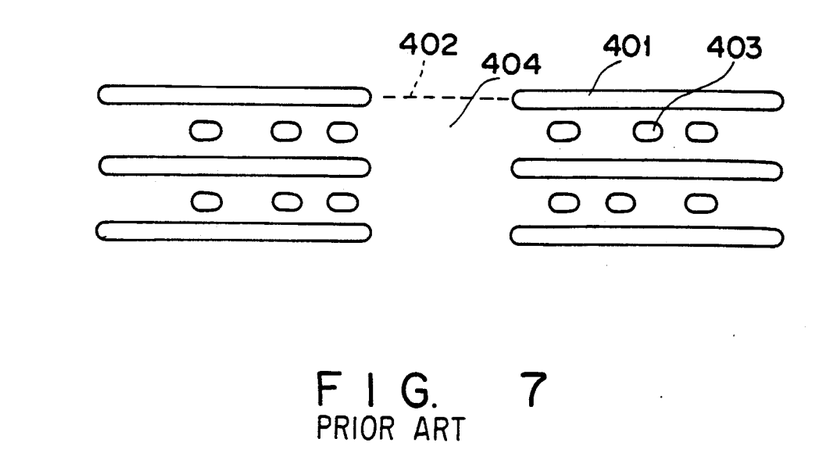
FIG. 7 is an enlarged plan view showing a part of a conventional optical disk.

FIG. 7 is an enlarged plan view of the optical disk of the type described in the preceding paragraph. As is shown in this figure, guide grooves 401 extend along the concentric tracks or the spiral track, prepits 403 are formed in each track, and a mirror-surface area 404 extends in the radial direction of the disk. The concentric tracks or the turns of the spiral track are spaced apart from one another, at intervals of 1.6 μm. The grooves 401 and the prepits 403 have been formed at the time of manufacturing the substrate of the disk. The prepits 403 are used as sector marks, as marks for generating clock-sync signals, or as marks representing address data.

Figure 8:
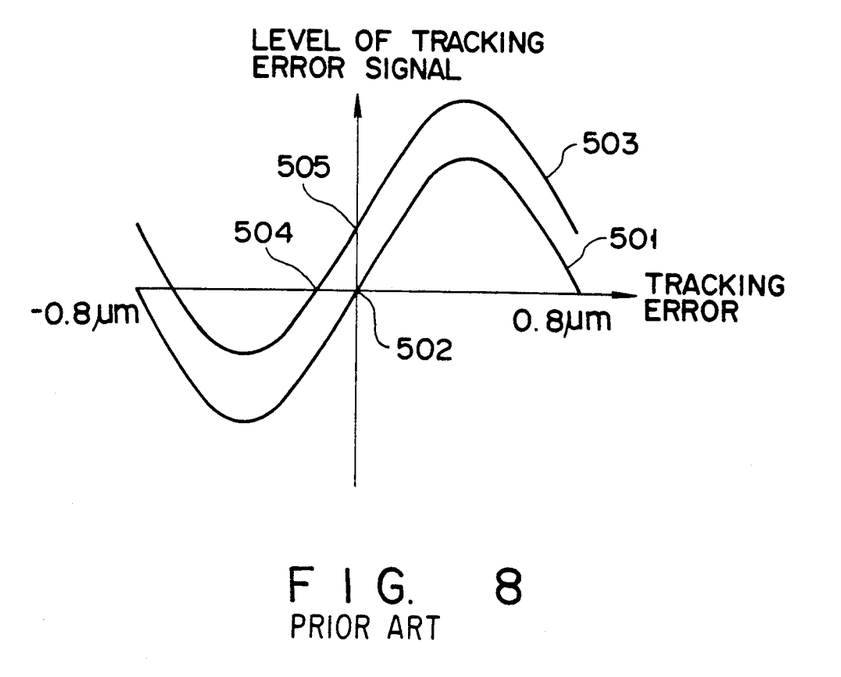
FIG. 8 is a graph representing the tracking-error detecting characteristic of a conventional optical disk apparatus using the optical disk shown in FIG. 7.

FIG. 8 is a graph explaining how the levels of two tracking error signals change with time, which are being generated from a beam reflected from the optical disk shown in FIG. 7. Plotted on the horizontal axis is the tracking error, i.e., the distance between the center line of the target track and the center of the light spot the converged laser beam forms on the disk. Plotted on the vertical axis is the level of either tracking error signal.

Curve 501 designates an error signal generated from a laser beam reflected from the disk when the target track does not deviate from the axis of the objective lens, nor the warps or inclines. As can be understood from the curve 501, the error signal is at zero level when there are no tracking errors. The operating point 502 of feedback control for setting the error signal 501 at zero level is located at the origin (0, 0). As a result, excellent tracking control can be achieved in accordance with the tracking error signal 501.

On the other hand, signal curve 503 designates a tracking error signal generated from a laser beam reflected from the disk when the objective lens deviates from the axis of the optical head, or when the disk has static deflection or tilt. As is evident from the curve 503, this error signal is not at zero level when there are no tracking errors. Consequently, good tracking control cannot be accomplished in accordance with this tracking error signal curve 503. To achieve excellent tracking control, it is necessary to evaluate the offset 505 of the error signal curve 503 (i.e., the level which the error signal has when the tracking error is zero), and to perform correcting of the error signal and perform feedback control by the value corresponding to this offset 505.

When the objective lens deviates from the axis of the optical head, or when the disk warps or inclines, the tracking error signal generated from the laser beam reflected from any mirror-surface area of the disk has an offset, too. This offset is substantially proportional to, or is a simple function of, the offset 505 of the error signal generated from any guide groove 401. Hence, the offset of the tracking error signal generated from the beam reflected from the groove 401 can be compensated to a little extent in accordance with the tracking error signal generated from the beam reflected from the mirror-surface area 404.

In order to increase the reliability of the optical disk apparatus or the recording density, it is required that tracking control be achieved with higher precision. However, no high-precision tracking control can be accomplished by the above-described technique, wherein the offset of a tracking error signal generated from a laser beam reflected from the guide groove is compensated in accordance with a tracking error signal generated from a beam reflected from a mirror-surface area adjacent to the mirror-surface area. This is because the offset cannot be detected with a sufficiently high precision.

The tracking control technique, explained above with reference to FIGS. 7 and 8, is disadvantageous. The mirror-surface areas 404 may cause errors in counting the tracks which the laser beam crosses as the optical head is moved in the radial direction of the optical disk to the desired track. Track-counting errors, if any, can make a prominent bar to an increase in data-accessing speed of the optical disk apparatus.

In summary, the conventional technique of correcting the offset of a tracking error signal generated from a laser beam reflected from the guide groove adjacent to the mirror-surface area in accordance with a tracking error signal generated from a beam reflected from a mirror-surface area is disadvantageous in two respects. First it is hard to accomplish high-precision tracking control since the offset cannot be detected with a sufficiently high accuracy. Second, the mirror-surface areas may cause errors in counting the tracks scanned by the laser beam emitted from the optical head moving in the radial direction of the optical disk to the desired track, inevitably rendering high-precision access control impossible.

SUMMARY OF THE INVENTION

The object of the invention is to provide an optical recording medium which allows for both high-precision tracking control and high-precision access control, and also an optical recording apparatus using the recording medium.

According to a first aspect of the invention, there is provided an optical recording medium having a plurality of parallel guide grooves, a plurality of tracks formed among the guide grooves, a plurality of offset-compensating areas spaced apart in lengthwise direction of the tracks and separating each of the guide grooves into portions and a plurality of pits formed in the offset-compensating areas and extending in the center line of the tracks.

According to the first aspect of the invention, too, there is provided an optical recording apparatus which applies a light beam to the optical recording medium described above, thereby to record data on the medium and reproduce data therefrom, and in which first and second tracking error signals, which represent the distance between the center of a light spot formed on the medium and the center line of a target track, are generated from diffracted light beams reflected from any one of the guide grooves and the offset-compensating area adjacent to the guide groove, the first tracking error signal is corrected in accordance with the second tracking signal, and the position of the light spot is controlled in accordance with the first tracking error signal thus corrected.

According to a second aspect of the present invention, there is provided an optical recording medium having a plurality of parallel guide grooves, a plurality of tracks formed among the guide grooves, and a plurality of offset-compensating areas spaced apart in lengthwise direction of the tracks, each having continuous two portions curved in the opposite directions.

According to the second aspect of the invention, too, there is provided an optical recording apparatus which applies a light beam to the optical recording medium described in the preceding paragraph, thereby to record data on the medium and reproduce data therefrom, and in which a tracking error signal, which represents the distance between the center of a light spot formed on the medium and the center line of a target track, is generated from a diffracted light beam reflected from any one of the guide grooves, and an offset-correcting signal is generated from the diffracted light beams reflected from the two curved portions of any guiding groove, the tracking error signal is corrected in accordance with the offset-correcting signal, and the position of the light spot is controlled in accordance with the first tracking error signal thus corrected.

The optical recording medium according to the first aspect of the invention has pits formed in each offset-compensating area and optically functioning in the same way as as the guide grooves. Hence, when the objective lens deviates from the axis of the optical head, or when the medium warps or inclines, the second tracking error signal generated from the diffracted light beam reflected from an pit, has the same offset as the first tracking error signal which has been generated from the diffracted light beam reflected from the guide groove adjacent to the pit, and its magnitude changes in the opposite direction with respect to the magnitude of the first tracking error signal. The offset of the first tracking error signal is compensated by subtracting the second error signal from the first, whereby high-accuracy tracking control can be achieved.

Since the pits formed in each offset-compensating area optically function in the same way as the guide groove, the tracks irradiated with a light spot and, hence, accessed can be counted accurately.

As has been described, the optical recording medium according to the second aspect of the invention has offset-compensating areas and guide grooves, each having first and second portions both located in each offset-compensating area and deviated in the opposite directions. The diffracted light beams reflected from the first and second curved portions of any guide groove are detected, an intensity difference between these light beams is obtained, and an offset-correcting signal representing this intensity difference is generated. The tracking error signal generated from the diffracted light beam reflected from the any other portion of the guide groove is corrected in accordance with the offset-correcting signal, thereby removing from the tracking error signal the offset which has resulted from the deviation of the objective lens from the axis of the optical head, or the warping or inclination of the optical recording medium. In other words, the offset is readily compensated.

Since the guide grooves are continuous, formed also in any offset-compensating area, the tracks irradiated with a light spot and, hence, accessed can be counted more accurately than in the case of the optical recording medium according to the first aspect of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
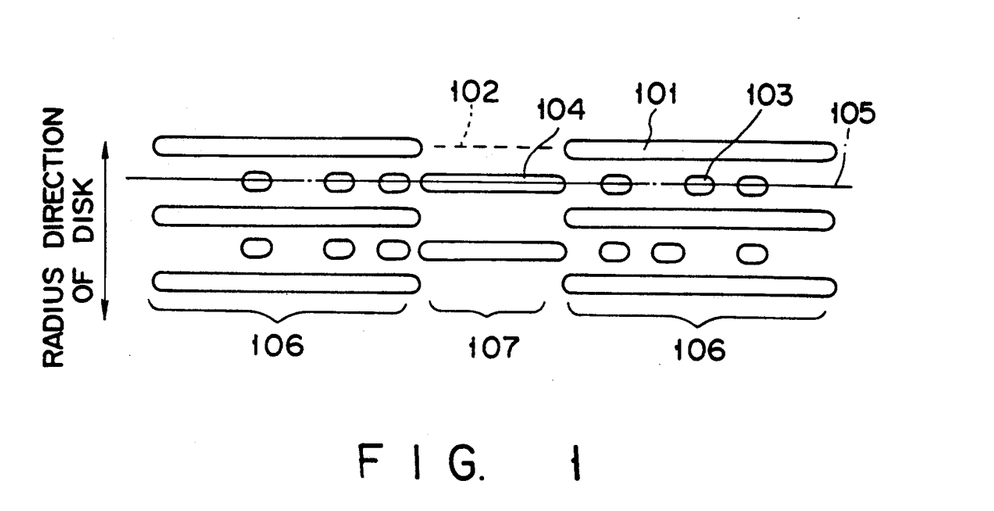
FIG. 1 is an enlarged plan view illustrating a part of an optical disk according to an embodiment of the invention.

An optical disk, which is an embodiment of the present invention, will be described with reference to FIG. 1. As shown in FIG. 1, the optical disk has a plurality of guide grooves 101 arranged on a track formed in a concentric or spiral pattern on the surface of the optical disk. The guide grooves are substantially parallel to a center line 105 of the track. FIG. 1 shows a portion of two adjacent tracks. A plurality of prepits 103 are formed and arranged sequentially along the center line of each track, and an area 102 is provided including predetermined gaps between each of the adjacent guide grooves 101. Also shown in FIG. 1 is a plurality of mirror-surface areas 107, formed to reflect light, and arranged in the radial direction of the disk. The optical disk further has elongated pits 104, each formed in the mirror-surface area 107 and, hence, located between two guide grooves of two adjacent sets. The elongated pits 104 are used to compensate for the offsets of tracking error signals generated from diffracted laser beams reflected from the guide grooves 101. Hereinafter, those areas 106 in which the guide grooves 101 are formed will be called "guide areas," and the mirror-surface areas 107 in which the elongated pits 104 are formed will be referred to as "offset-compensating areas."

Figure 9:
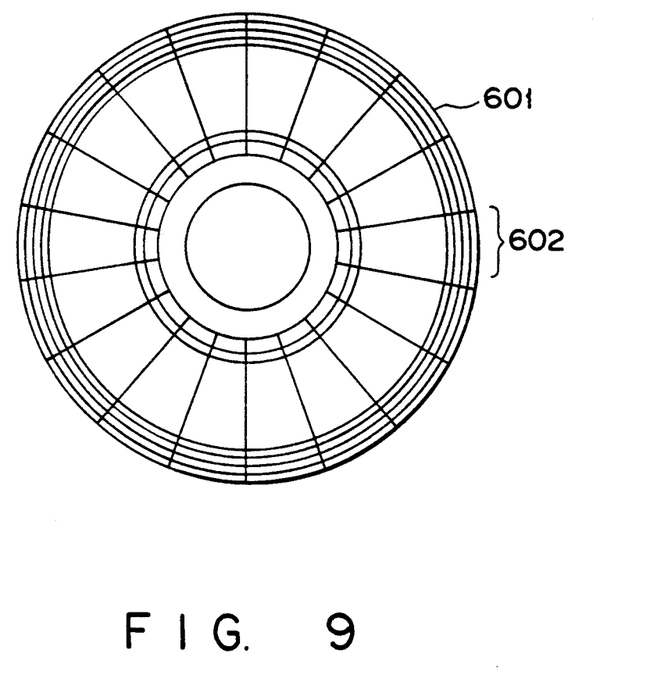
FIG. 9 is a plan view explaining how the optical disk according to the invention is formatted, thus having tracks and sectors.

As is shown in FIG. 9, the optical disk has a number of concentric circular tracks 601. The recording layer of the disk consists of a plurality of sectors. The guide areas 106 and the offset-compensating areas 107 are formed in the recording layer such that these areas extend in the radial direction of the disk and are spaced apart from one another along the concentric tracks. In the case of an optical disk having a spiral track, the guide areas 106 and the offset-compensating areas 107 are formed in the same way.

The guide grooves 101, the prepits 103, and the elongated pits 104 have been formed at the time of manufacturing the optical disk. The prepits are used as sector marks as marks for generating clock-sync signals, or as marks representing address data.

Figure 2:
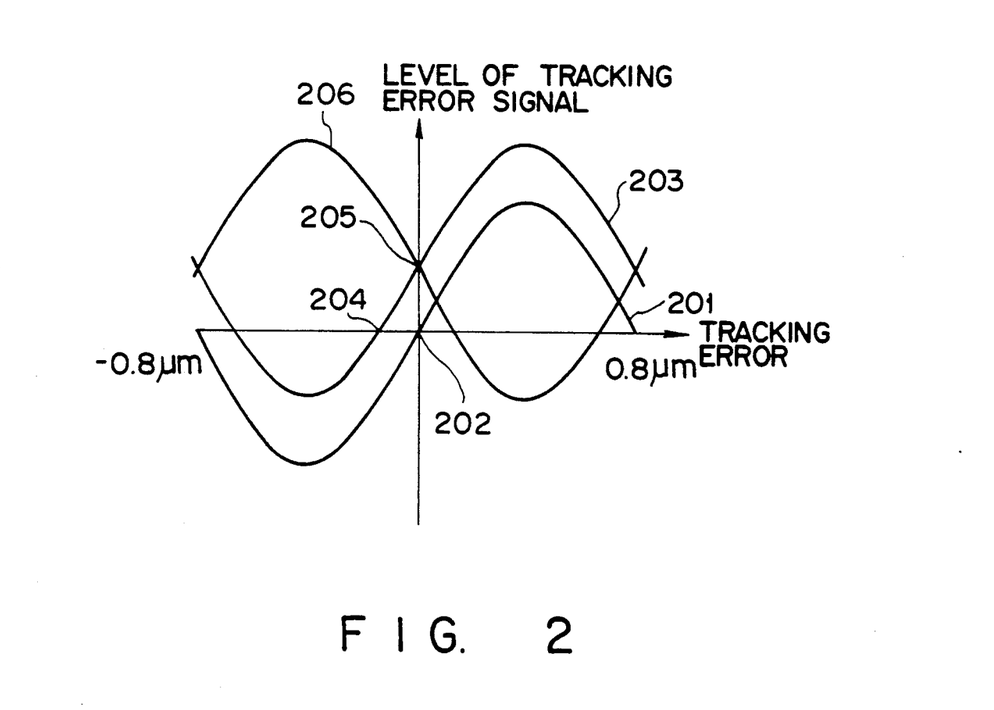
FIG. 2 is a graph representing the tracking-error detecting characteristic of an optical disk apparatus using the optical disk shown in FIG. 1.

The optical disk shown in FIG. 1, in particular the function of the offset-compensating areas 107, will now be described, with reference to FIG. 2. FIG. 2 represents the tracking-error detecting characteristic of an optical disk apparatus using the optical disk of FIG. 1. As in FIG. 8, plotted on the horizontal axis is the tracking error, i.e., the distance between the center line of the target track and the center of the light spot the converged laser beam forms on the disk. Plotted on the vertical axis is the level of either tracking error signal. The concentric tracks 601 are spaced apart from one another, at intervals of 1.6 $\mu$m.

In FIG. 2, curve 201 designates an error signal generated from a laser beam reflected from the disk when the objective lens does not deviate from the axis of the optical head, nor when the disk warps or inclines. As the curve 201 shows, the error signal is at zero level when there are no tracking errors. The operating point 202 of feedback control for setting the error signal curve 201 at zero level is located at the origin (0, 0). As a result, excellent tracking control can be achieved in accordance with the tracking error signal curve 201.

Curve 203 in FIG. 2 designates a tracking error signal generated from a laser beam reflected from the disk when the objective lens deviates from the axis of the optical head, or when the disk warps or inclines. As is evident from the curve 203, this error signal is not at zero level when there are no tracking errors. If the feedback control is performed in accordance with this error signal 204, the operating point 204 of the feedback control will deviate from the origin (0, 0). Consequently, good tracking control cannot be accomplished in accordance with this tracking error signal curve 203. To achieve excellent tracking control, it is necessary to evaluate the offset 205 of the error signal curve 203, or the level which the error signal has when the tracking error is zero, and to correct the error signal curve 203 by the value corresponding to this offset 205 and perform feed back control.

In the conventional optical apparatus, the offset of the tracking error signal 503 generated from the laser beam reflected from the groove 401 is compensated, but to some extent, in accordance with the tracking error signal generated from the beam reflected from the mirror-surface area 404. In the apparatus according to the invention, the error signal 202 is compensated more reliably in accordance with the tracking error signal generated from a diffracted laser beam reflected from an elongated pit 104 formed in the offset-compensating area 107.

The tracking error signal curve 206 also has an offset, if generated from a diffracted laser beam reflected from the elongated pit formed in the offset-compensating area 107 when the objective lens deviates from the axis of the optical head, or when the disk warps or inclines. The elongated pits 104 have the same cross section as the guide grooves 101. Hence, the tracking error signal generated from a diffracted laser beam reflected from the elongated pit 104 has its level changed as is indicated by curve 206 in FIG. 2. In other words, this error signal curve 206 has the same offset as the tracking error signal 203 generated from the laser beam reflected from the guide area 106, and its waveform deviates by 0.8 μm, i.e., half the track pitch, from the waveform of the tracking error signal curve 203. As is evident from FIG. 2, the signal curve 206 is 180° out of phase with respect to the signal curve 203. In other words, the magnitudes of the signal curves 203 and 206 are changing in the opposite directions at any given tracking error. The difference between these signal curve 203 and 206 is obtained. The tracking control is carried out in accordance with the difference, more reliably and accurately than in the conventional optical disk apparatus which perform tracking control in accordance with a tracking error signal generated from a laser beam reflected from a mirror-surface area.

The optical disk apparatus according to the invention, which uses the optical disk of FIG. 1 as recording medium, will now be described with reference to FIG. 3.

Figure 3:
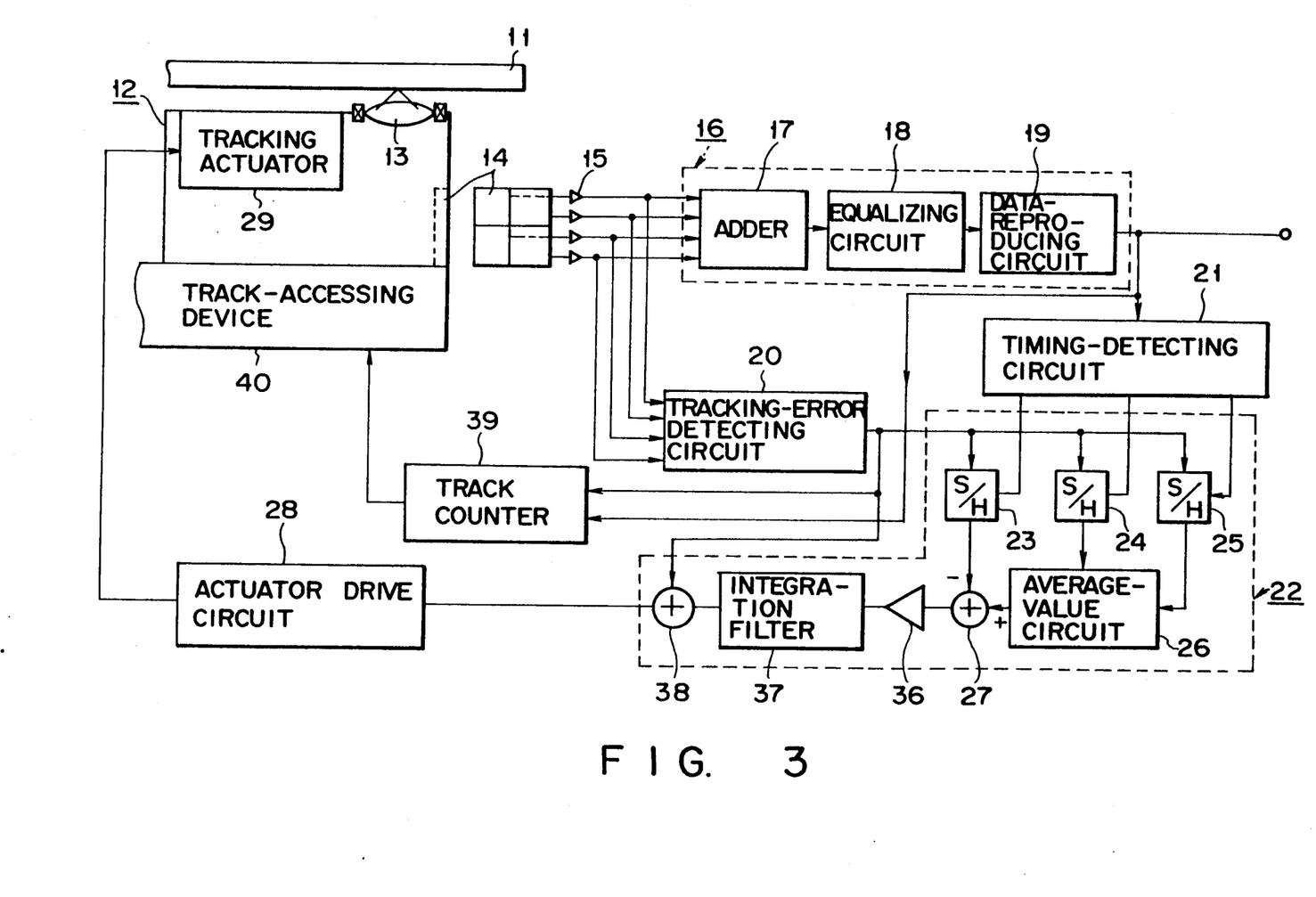
FIG. 3 is a block diagram showing the optical disk apparatus in which the disk of FIG. 1 is used.

As is illustrated in FIG. 3, the optical disk apparatus has an optical head 12, 4-elements photo-detector 14, amplifiers 15, a signal-processing circuit 16, a tracking-error detecting circuit 20, a timing-detecting circuit 21, an offset-compensating circuit 22, an actuator drive circuit 28, a tracking actuator 29, a track counter 39, and a track-accessing device 40.

The optical head 12 is designed to record data on, and reproduce data from, the optical disk 11 set in the optical disk apparatus. The head 12 comprises an optical system including an objective lens 13, and a light source (e.g., a semiconductor laser).

The optical detector 14 which opposes the optical disk 11, for detecting a diffracted laser beam reflected from the optical disk 11. The detector 14 has four photoelectric segments each of which converts input light into an electric signal. The four electric signals output by the segments are input to the amplifiers 15, which amplify the signals. The amplified signals are supplied to the signal-processing circuit 16 and also to the tracking-error detecting circuit 20.

The signal-processing circuit 16 comprises an adder 17 for adding the four signals output from the detector 14, an equalizing circuit 18 for equalizing the waveform of the signal output from the adder 17, and a data-reproducing circuit 19 of the known type designed for reproducing the data recorded on the disk 11.

The tracking-error detecting circuit 20 obtains the sum of the signals output by those two photoelectric segments of the detector 14 which are arranged along the tracks of the disk 11, and the difference between the signals output by those two photoelectric segments of the detector 14 which are arranged along a radius of the disk 11, thereby to generate a tracking error signal. The tracking error signal has a level which repeatedly rises and falls in accordance with the magnitude of the tracking error and the direction in which the light spot formed on the disk 11 deviates from the center line of the target track. The tracking-error detecting circuit 20 is of the known type, and will not be described in further detail.

The signal-processing circuit 16 is supplied to the timing circuit 21. The circuit 21 detects the timing the offset-compensating area 107 of any sector is irradiated with the light spot, the timings the light spot illuminates that end of any guide groove 101 and that end of the next guide groove 101, which are rear and front relative to the direction of the rotation of the disk 11, respectively. Upon detecting these timings, the circuit 21 generates timing pulses. The timing pulses are supplied to the offset-compensating circuit 22.

The offset-compensating circuit 22 comprises a sample-and-hold circuits 23, 24 and 25, an average-value circuit 26, a subtracter circuit 27, an amplifier 36, an integration filter 37, and an adder 38. When any offset-compensating area 107 is irradiated with the light spot, the offset-compensating circuit 22 samples and holds the tacking error signal 203 which the tracking-error detecting circuit 20 has generated from the laser beam reflected from the guide area 106, and also the tracking error signal curve 206 which the tracking-error detecting circuit 20 has generated from the laser beam reflected from the offset-compensating area 107. Further, the circuit 22 compensates the offset 205 of the tracking error signal curve 203.

The sample-and-hold circuits 23, 24, and 25 sample the tracking error signal output by the tracking-error detecting circuit 20, with the three timing pulses supplied from the timing detecting circuit 21. More precisely, the sample-and-hold circuit 23 samples the tracking error signal at the timing the offset-compensating area 107 is irradiated, and outputs a signal which corresponds to the tracking error signal 206 generated from the laser beam reflected from the offset-compensating area 107. The output signal of the sample-hold-circuit 23 is supplied to the subtracter circuit 27. The sample-and-hold circuits 24 and 25 sample the tracking error signal at the timings the light spot illuminates that end of any guide groove 101 and that end of the next guide groove 101 which are rear and front relative to the direction of the rotation of the disk 11, respectively, and then outputs signals. The output signals of the circuits 24 and 25 are supplied to the average-value circuit 26. The circuit 26 produces a signal at the average level of the input signals. The signal produced by the circuit 26 corresponds to the tracking error signal curve 203 generated from the laser beam reflected from the guide groove 101.

As has been described, the offset-compensating area 107 has no guide grooves. Nonetheless, the use of the sample-and-hold circuits 24 and 25 can produce the tracking error signal curve 203 since they sample the tracking error signal at the timings the light spot illuminates that end of any guide groove 101 and that end of the next guide groove 101 which are rear and front relative to the direction of the rotation of the disk 11, respectively The sample-and-hold circuit 24 or 25, and the average-value circuit 26 can be dispensed with. In the case where circuit 24 or 25 and the circuit 26 are not used, the sample-and-hold circuit 24 or 25 is used to sample the tracking error signal output of the circuit 20, at the timings the light spot illuminates that end of any guide groove 101 or that end of the next guide groove 101 which are rear and front relative to the direction of the rotation of the disk 11, thereby to produce the tracking error signal curve 203.

The signal curve 203 output by the average-value circuit 26 is input to the subtracter 27. The subtracter 27 subtracts the output signal of the circuit 26 from the output signal of the sample-and-hold circuit 23, there by producing an offset-compensating signal. The amplifier 36 amplifies the offset-compensating signal. The signal, thus amplified, is supplied via the integration filter 37 to the adder 38. Meanwhile, the tracking error signal is supplied to the adder 38 from the tracking-error detecting circuit 20. Hence, the adders 38 adds the offset-compensating signal and the tracking error signal, thus generating a sum signal which is a tracking error signal containing no offset. The sum signal is input to the actuator drive circuit 28. In accordance with the sum signal, the circuit 28 drives the tracking actuator 29. The circuit 28 not only performs phase compensation and amplification, thereby to optimize feedback control, but also moving the objective lens such that the light spot jumps to any adjacent track (track jump control).

In the meantime, the track counter 39 receives the signal output by the signal-processing circuit 16 and also the tracking error signals from the tracking-error detecting circuit 20, and counts the tracks irradiated with the laser beam, by the method hitherto known. The output signal of the counter 39 is supplied to the track-accessing device 40. The track-accessing device 40 carries out track-accessing control in accordance with the output signal of the track counter 39.

As has been pointed out, the elongated pits 104 have the same cross section as the guide grooves 101. Hence, each elongate pit 104 serves to achieve track-counting, just as do the guide grooves 101, thus reducing the possibility of erroneous track-counting. (Erroneous track-counting cannot be completely eliminated since each elongated pit 104 is spaced apart from either adjacent guide groove 101 in the radial direction of the disk 11 by half the track pitch. Since the possibility of erroneous track-counting is reduced, the offset-compensating areas 107 can made broader than the mirror-surface areas 404 of the conventional optical disk (FIG. 7). Therefore, the offset of a tracking error signal can be compensated more reliably than otherwise.

Figure 4:
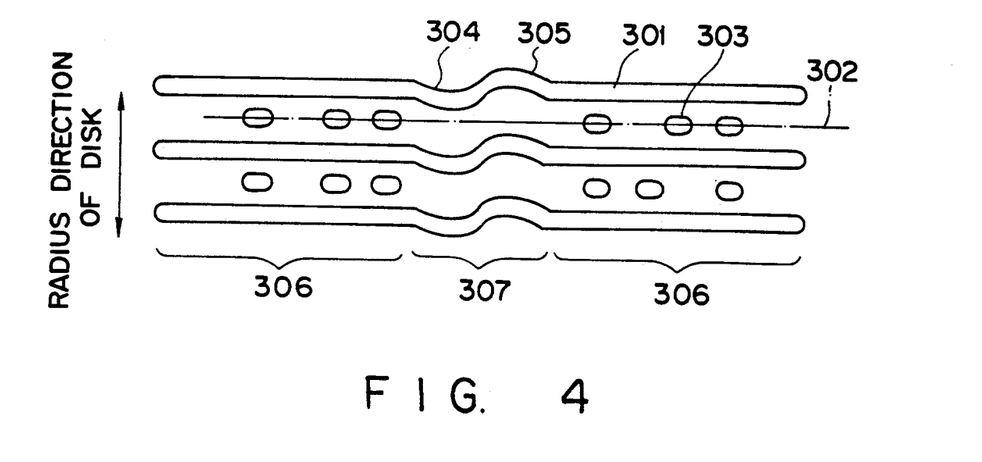
FIG. 4 is an enlarged plan view showing a part of an optical disk according to a second embodiment of the present invention.

FIG. 4 is an enlarged plan view showing a part of an optical disk according to another embodiment of the present invention. As is illustrated in FIG. 4, the disk has parallel guide groove 301 defining tracks among them. The disk has a plurality of regions 30 and a plurality of regions 307. These regions 306 and 307 extend along the radii of the disk. Prepits 303 are formed in those portions of the tracks which are in the regions 306, and arranged in the center lines 302 of the tracks. No prepits 303 are formed in each region 307. Hereinafter, each of these regions 307 will be referred to as "offset-compensating areas," and the remaining regions 306 of the disk, in which prepits 303 are formed, will be referred to as guide groove areas."

That part of each guide groove 301 which is formed in any offset-compensating area 307 consists of two portions 304 and 305 deviated in the opposite directions, such that they form a letter of S. These curved portions 304 and 305 serve to compensate the offset, if any, of a tracking error signal generated from a diffracted laser beam reflected from any guide groove 301.

The optical disk, part of which is shown in FIG. 4, is of the same type shown in FIG. 9. It has a number of concentric circular tracks 601. The recording layer of the disk consists of a plurality of sectors. The guide areas 306 and the offset-compensating areas 307 are formed in the recording layer such that these areas extend in the radial direction of the disk and are spaced apart from one another along the concentric tracks. In the case of an optical disk (not shown) having a spiral track, the guide areas 106 and the offset-compensating areas 107 are formed in the same way.

The guide grooves 301, each have an S-shaped part, have been formed, simultaneously with the prepits 303, by momentarily vibrating a groove-forming laser beam by means of an acousto-optic device. The prepits 303 are used as sector marks, as marks for generating clock-sync signals, or as marks representing address data.

Figure 5A:
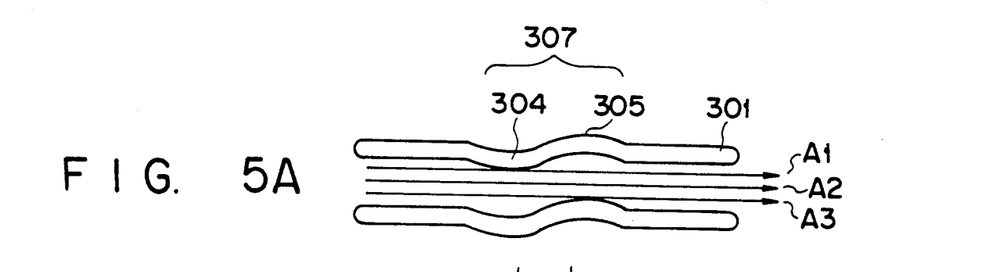
FIG. 5A is an enlarged plan view illustrating adjacent two of the guide grooves formed in the surface of the optical disk shown in FIG. 4.
Figure 5B:
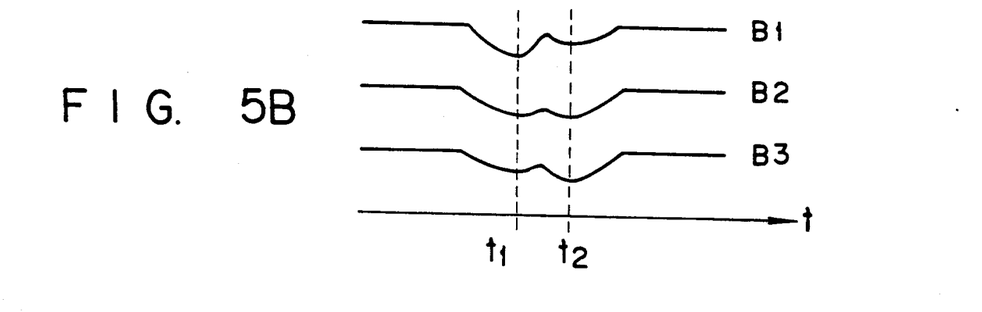
FIG. 5B is a graph representing the tracking-error detecting characteristic of an optical disk apparatus using the optical disk shown in FIG. 4.

The function if the offset-compensating areas 307 will be explained, with reference to FIGS. 5A and 5B. FIG. 5A is an enlarged plan view showing adjacent two of the guide groove formed in the surface of the optical disk, and FIG. 5B is a timing chart showing the waveforms of three signals B1, B2 and B3 which an optical detector outputs when a light spot scans the track along lines A1, A2 and A3 shown in FIG. 5A, respectively. The light spot scans the track along the line A1 when the track deviates inwards from the axis of the objective lens; it correctly scans the track along the line A2 (i.e., the center line of the track); it scans the track along the line A3 when the track deviates outwards from the axis of the objective lens.

As is evident from FIGS. 5A and 5B, the levels of the signals B1, B2, B3 fall at time $t_1$ and time $t_2$. This is because, in the offset area 307, the light spot illuminates a part of the curved portion 304 of a guide groove 301 and then a part of the curved portion 305 of the adjacent guide groove 301, as it scans the track along the lines A1, A2, and A3. More precisely, the signal B2, which is generated when the light spot correctly scans the track along the line A2, falls to almost the same level at time $t_1$ and time $t_2$. By contrast, the level of the signal B1, which is generated when the light spot scans the track along line A1, falls more at time $t_1$ than at time $t_2$; the level of the signal B3, which is generated when the light spot incorrectly scans the track along the line A3, fall less at time $t_1$ than at time $t_2$. Thus, the signal output by the optical detector is sampled at times $t_1$ and $t_2$ by using timing pulses (later described), and the difference between the two sampled signal segments is obtained and used as a tracking error signal which contains no offset resulting from the deviation of the objective lens from the axis of the optical head, or from the warping or inclination of the disk. Therefore, this tracking error signal is used, compensating the offset contained in the tracking error signal generated from the laser beam reflected from any guide area 306. The tracking error signal generated from the laser beam reflected from the off-set area 307 enhances the accuracy of the tracking control.

Figure 5C:
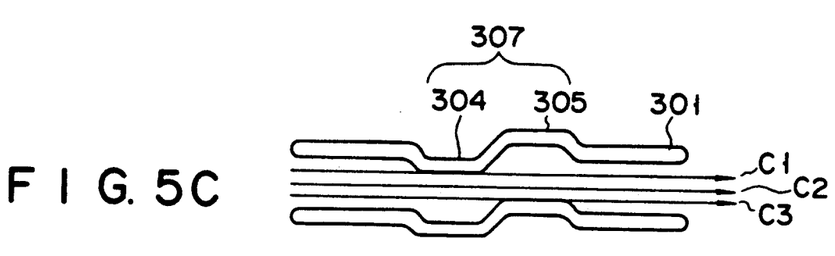
FIG. 5C is another enlarged plan view illustrating adjacent two of the guide grooves formed in the surface of the optical disk shown in FIG. 4.
Figure 5D:
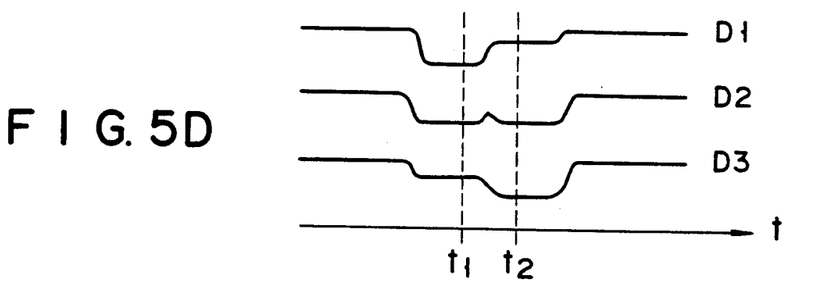
FIG. 5D is another graph representing the tracking error detecting characteristic of an optical disk apparatus using the optical disk shown in FIG. 4.

FIGS. 5C and 5D show another embodiment of the present invention, especially about the shape of the deviated portion of the guide groove.

Referencing to FIGS. 5C and 5D, the same result is obtained just like above description.

Figure 6:
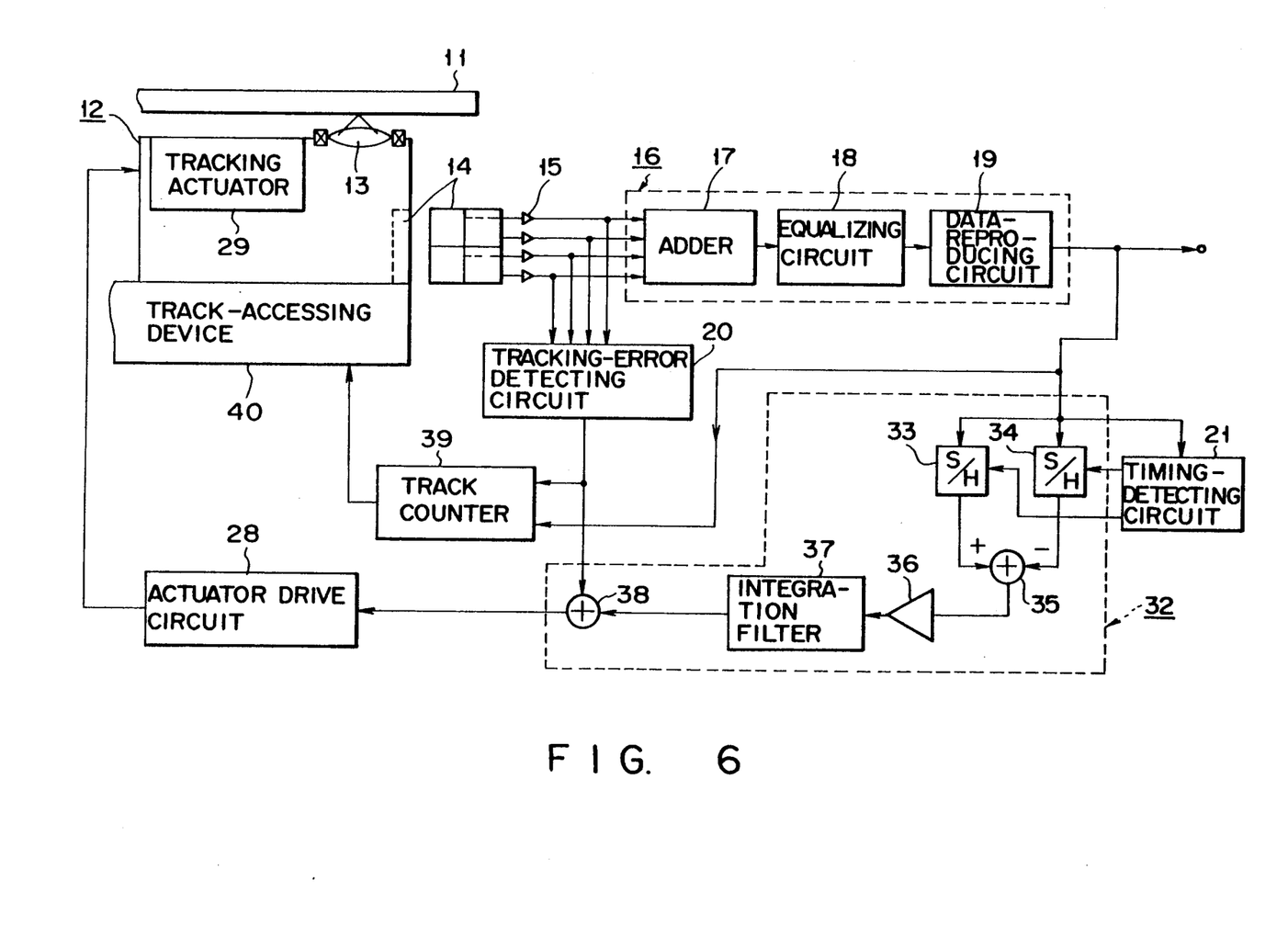
FIG. 6 is a block diagram illustrating the optical disk apparatus in which the disk of FIG. 4 is used.

FIG. 6 illustrates an optical disk apparatus in which the disk of FIG. 4 is used. This apparatus is similar to that of FIG. 3, and its components which are identical or similar to those of the apparatus shown in FIG. 3 are designated at the same numerals, and will not be described in detail.

As is shown in FIG. 6, this apparatus comprises an optical head 12, amplifiers 15, a signal-processing circuit 16, and a tracking-error detecting circuit 20. These components 12, 15, 16, and 20 are identical the components designated at the same numerals in FIG. 3. The head 12 is designed to record data on, and reproduce data from, the optical disk 11 of the type shown in FIG. 4 which is set in the optical disk apparatus.

The signal output by the signal-processing circuit 16 is supplied to a timing detecting circuit 21. The circuit 21 outputs two timing pulses at time $t_1$ and time $t_2$. The light spot irradiates two deviated edges of the offset area 307, respectively. The circuit 21 generates two timing signals based on the time at which the optical detector generates a signal from the diffracted laser beam reflected from the prepit 303 immediately preceding the offset area 307. These timing pulses are supplied to a offset-compensating circuit 32.

The offset-compensating circuit 32 comprises sample-and-hold circuits 33 and 34, a subtracter circuit 35, an amplifier 36, an integration filter 37, and an adder 38. The sample-and-hold circuits 33 and 34 sample and hold the signal reproduced by the circuit 16 upon receipt of the timing signals supplied from the circuit 21, that is, at time $t_1$ and $t_2$ (FIG. 5B), respectively. The subtracter circuit 35 finds the difference between the outputs of the sample-and-hold circuits 33 and 34 and generates an offset-compensating signal representing this difference. The amplifier 36 amplifies the offset-compensating signal. The amplified offset-compensating signal is input to the adder 38 through the integration filter 37. The adder 38 adds the offset-compensating signal to the tracking error signal supplied from the tracking-error detecting circuit 20. The adder 38 output a tracking error signal which contains no offset resulting from the deviation of the objective lens from the axis of the optical head 13, the warping of the disk 11, or the inclination of the disk 11. The offset-free tracking error signal is input to the actuator drive circuit 28. In accordance with this signal, the circuit 28 drives a tracking actuator 29. Driven by the circuit 28 operating in accordance with the offset-free signal, the actuator 29 performs tracking control with high accuracy.

In the meantime, a track counter 39 receives the signal output by the signal-processing circuit 16 and also the tracking error signals output by the tracking-error detecting circuit 20, and counts the tracks irradiated with the laser beam, by the method hitherto known. The output signal of the counter 39 is supplied to the track-accessing device 40. The track-accessing device 40 carries out track-accessing control in accordance with the output signal of the track counter 39 Unlike the guide grooves 101 of the disk shown in FIG. 1, the guide grooves 301 are continuous, each having curved portions 304 and 305 formed in the offset area 307. The continuous grooves 301 serve to increase the accuracy of the track-counting.

The present invention is not limited to the embodiments described above. Various changes and modifications can be made without departing the scope of the invention.

For instance, an A/D converter can be used to convert the output of the tracking-error detecting circuit 20 to a digital signal, and the sample-and-hold circuits, the average-value circuit, the subtracter circuit, the adder, and the like—all being analog circuits used in the apparatuses of FIGS. 4 and 6—can be replaced by digital circuits.

Each sector of the optical disk 11 can have either one offset area or a plurality of offset areas. Further, the pits 104 formed in the offset compensating area 107 (FIG. 1) need not be elongated ones; pits of other shapes can be formed in the offset compensating area 107.

Moreover, the present invention can be applied to optical recording media other than such optical disks described above. It can be applied to a card-shaped optical recording medium and a tape-shaped optical recording medium.

As may be understood from the above, the present invention can provide an optical recording medium which allows for compensation of the offset in a tracking error signal, and ultimately allows for both high-precision tracking control and high-precision access control. The invention can also provide an optical recording apparatus which can record data on a recording medium of this type in high density and with high reliability, and which can also access any desired part of the medium at high speed.

Further, when the recording medium of the invention is used in the apparatus of the invention, a track-counting error is, if any, very small. The time required for accessing an desired part of the medium can therefore be much shortened. In view of this, the optical recording apparatus according to the invention can find many uses.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical recording medium having:

a plurality of guide grooves being parallel or substantially parallel in a radial direction of said medium, an adjacent two of said guide grooves forming a track therebetween;

offset-compensating areas spaced apart a predetermined distance in a lengthwise direction of said guide grooves, and dividing each of said tracks into portions; and a plurality of first pits formed in each portion between each adjacent two of said guide grooves;

said offset-compensating area having only a plurality of second pits formed only in a center line of said tracks and extending across an entire dimension of said offset-compensating area in said lengthwise direction; and wherein ends of each of said second pits are in contact with two tangential lines each connecting end portions of said adjacent two guide grooves in the radial direction of the optical recording medium.

2. An optical recording medium according to claim 1, wherein said second pits have the same sectional shape as said guide groove thereof.

3. An optical recording medium having:

a plurality of guide grooves being parallel or substantially parallel in a radial direction of said medium, adjacent two of said guide grooves having a uniform width and forming a track therebetween;

a plurality of offset-compensating areas each having a uniform width and including an s-shaped portion, and spaced apart a predetermined distance in a lengthwise direction of the tracks and disposed between corresponding pairs of said guide grooves formed only in each of said offset-compensating areas, each of said offset-compensating areas consisting of two curved portions continuously formed in said lengthwise direction deviated about said guide grooves in a direction perpendicular to said lengthwise direction in opposite directions, respectively, said s-shaped portions being substantially identical in length and width and conformable in shape to one another.

4. An optical recording medium having:

plurality of guide grooves being parallel or substantially parallel in a radial direction of said medium, an adjacent two of said guide grooves forming a track therebetween;

offset-compensating areas spaced apart a predetermined distance in a lengthwise direction of said guide grooves, and dividing each of said tracks into portions;

a plurality of first pits formed in each portion between each adjacent two of said guide grooves; and tracking error compensation information means for generating tracking error compensation information and having a plurality of second pits being formed only in a center line of said tracks and extending across an entire dimension of said offset-compensating area in said lengthwise direction, said offset-compensation areas containing only said tracking error compensation information means and said tracking error compensation information being generated only in said offset-compensating areas.

5. A recording medium according to claim 4, wherein said tracking error compensation information means also generates track-count information.

* * * * *